US010099534B2

(12) United States Patent
Terai et al.

(10) Patent No.: US 10,099,534 B2
(45) Date of Patent: Oct. 16, 2018

(54) AIR-CONDITIONING REGISTER

(71) Applicant: TOYODA GOSEI CO., LTD., Kiyosu-shi, Aichi-ken (JP)

(72) Inventors: Nobuhiro Terai, Kiyosu (JP); Masaki Otake, Kiyosu (JP); Hiroshi Sakai, Kosai (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 106 days.

(21) Appl. No.: 15/194,913

(22) Filed: Jun. 28, 2016

(65) Prior Publication Data
US 2017/0021692 A1 Jan. 26, 2017

(30) Foreign Application Priority Data

Jul. 22, 2015 (JP) .................................. 2015-145047

(51) Int. Cl.
 *B60H 1/00* (2006.01)
 *B60H 1/34* (2006.01)
(52) U.S. Cl.
 CPC ....... *B60H 1/00535* (2013.01); *B60H 1/3421* (2013.01); *B60H 2001/3471* (2013.01)
(58) Field of Classification Search
 CPC combination set(s) only.
 See application file for complete search history.

(56) References Cited

U.S. PATENT DOCUMENTS

| 2004/0002298 A1* | 1/2004 | Osada ................. B60H 1/3421 454/155 |
| 2004/0203334 A1 | 10/2004 | Shibata et al. |
| 2006/0172680 A1 | 8/2006 | Gehring et al. |

(Continued)

FOREIGN PATENT DOCUMENTS

| JP | 60-29713 U | 2/1985 |
| JP | 04-4652 U | 1/1992 |

(Continued)

OTHER PUBLICATIONS

JP2015042534MT; machine translation of JP2015042534A, foreign document provided by applicant with IDS dated Jun. 28, 2016.*

(Continued)

*Primary Examiner* — Gregory Huson
*Assistant Examiner* — Elizabeth M May
(74) *Attorney, Agent, or Firm* — Posz Law Group, PLC

(57) ABSTRACT

An interior component has a projecting portion projecting rearward at a position forward and downward from a vehicle occupant when the occupant maintains a sitting posture in a passenger compartment. The interior component has a front inclined surface section and a rear inclined surface section in a lower section of the projecting portion. A retainer and air-direction changing members arranged in the retainer are arranged immediately below the projecting portion at positions forward from the front inclined surface section. A manipulating member is arranged above the rear inclined surface section with at least a part of the manipulating member exposed rearward from the projecting portion. A first transmission mechanism and a second transmission mechanism, which transmit movement of the manipulating member to the air-direction changing members, are arranged in the interior component.

9 Claims, 7 Drawing Sheets

(56) References Cited

U.S. PATENT DOCUMENTS

2008/0146139 A1    6/2008  Terai et al.
2012/0276833 A1*  11/2012  Wittorf ................ B60H 1/3421
                                                          454/155

FOREIGN PATENT DOCUMENTS

| JP | 2000-318439 A | 11/2000 |
| JP | 2004-299461 A | 10/2004 |
| JP | 2006-327456 A | 12/2006 |
| JP | 2008-149828 A | 7/2007 |
| JP | 2013-116650 A | 6/2013 |
| JP | 2015-042534 A | 3/2015 |

OTHER PUBLICATIONS

Office action dated Jul. 22, 2018 issued in corresponding JP patent application No. 2015-145047 (and English machine translation thereof).

* cited by examiner

AIR-CONDITIONING REGISTER

BACKGROUND OF THE INVENTION

The present invention relates to an air-conditioning register that changes the direction in which air-conditioning air is blown into a passenger compartment through an outlet after having been supplied from an air conditioner and blocks the flow of air.

Vehicles have air-conditioning registers, which change the direction in which air-conditioning air is blown into a passenger compartment through an outlet after having been supplied from an air conditioner and block the flow of the air. Such an air-conditioning register typically includes a retainer having an airflow passage for air-conditioning air and an outlet, which is located at the downstream end of the flow direction of the air-conditioning air. An air-direction changing member, which changes the flow direction of the air-conditioning air, is arranged in the retainer. In the retainer, a manipulating member, which is manipulated by a vehicle occupant to operate the air-direction changing member, is arranged on the air-direction changing member (see, for example, Japanese Laid-Open Patent Publication No. 2013-116650).

Another type of air-conditioning register, in which the manipulating member is arranged at a position spaced from the air-direction changing member, such as a position outside the retainer, has also been proposed (see, for example, Japanese Laid-Open Patent Publication No. 2000-318439).

Recently, from the ornamental standpoint, there are demands that the outlet be made hard to see without hampering the essential function of the air-conditioning register.

However, conventional air-conditioning registers are not designed from the aforementioned standpoint and the outlet is arranged at a position visible to vehicle occupants. It is thus difficult to satisfy the above-described demands.

SUMMARY OF THE INVENTION

Accordingly, it is an objective of the present invention to provide an air-conditioning register capable of making an outlet of air-conditioning air hard to see by vehicle occupants.

To achieve the foregoing objective and in accordance with one aspect of the present invention, an air-conditioning register is provided that is adapted to be incorporated in an interior component having a projecting portion projecting rearward at a position forward and downward from a vehicle occupant maintaining a sitting posture in a passenger compartment. The projecting portion has, in a lower section, an inclined surface a height of which increases toward a rear side. The air-conditioning register includes a retainer, an air-direction changing member, a manipulating member, and a transmission mechanism. The retainer has an airflow passage for air-conditioning air and an outlet at a rear end of the retainer. The air-direction changing member is arranged in the retained to change a flow direction of the air-conditioning air in the airflow passage. The retainer and the air-direction changing member are arranged immediately below the projecting portion at a position forward from the inclined surface. The manipulating member is manipulated to operate the air-direction changing member. The manipulating member is arranged outside the retainer at a position above the inclined surface with at least a section of the manipulating member exposed rearward from the projecting portion. The transmission mechanism is arranged in the interior component, wherein the transmission mechanism transmits movement of the manipulating member to the air-direction changing member.

Hereinafter, "front and rear" are defined with reference to an occupant. The direction in which the occupant faces while maintaining a sitting posture is defined as a "front side". Therefore, if the occupant maintains the sitting posture while facing forward in the advancing direction of the vehicle, the "front side" coincides with the front side in the advancing direction of the vehicle. If the occupant faces in the vehicle width direction while maintaining the sitting posture, the "front side" coincides with the direction in which the occupant faces in the vehicle width direction.

In the above-described configuration, in the interior component in which the air-conditioning register is incorporated, the air-conditioning air flows in the airflow passage in the retainer, which is arranged immediately below a projecting portion. The air-conditioning air flows along the air-direction changing member and is then blown out from the outlet of the retainer.

When the manipulating member is manipulated by the occupant, movement of the manipulating member is transmitted to the air-direction changing member through the transmission mechanism. By pivoting the air-direction changing member, the flow direction of the air-conditioning air is changed. The air-conditioning air is then blown out from the outlet.

After having been blown out from the outlet, as has been described, the air-conditioning air flows along the inclined surface, which is formed in the lower section of the projecting portion, due to the Coanda effect. The flow direction of the air-conditioning air is thus changed to flow upward toward the occupant. Therefore, despite the fact that the outlet of the air-conditioning register is located forward and downward from the occupant, the air-conditioning air also flows toward the upper body of the occupant.

The projecting portion of the interior component is located between the occupant and a part of the air-conditioning register that includes the retainer and the air-direction changing member. In other words, the projecting portion of the interior component is located in the line of sight of the occupant when the occupant faces forward and downward. The projecting portion projects rearward at a position forward and downward from the occupant, thus hiding the retainer and the air-direction changing member from the side of to the occupant.

The manipulating member is arranged above the inclined surface of the projecting portion. Also, at least a part of the manipulating member is exposed rearward from the projecting portion. This ensures visual confirmation of the manipulating member by the occupant and facilitates manual manipulation of the manipulating member.

DETAILED DESCRIPTION OF THE PREFERRED EMBODIMENTS

An air-conditioning register according to one embodiment will now be described with reference to the attached drawings. The air-conditioning register is adapted to be incorporated in a rear section of a console box.

A vehicle occupant is seated on a vehicle seat, which is provided in a vehicle, while maintaining a seated position (a sitting posture) in a state facing forward in the advancing direction of the vehicle. In the present embodiment, directions are defined with reference to the occupant. The front side with reference to the occupant coincides with the advancing direction of the vehicle. The left-right direction with reference to the occupant coincides with the vehicle width direction.

Figure 2:
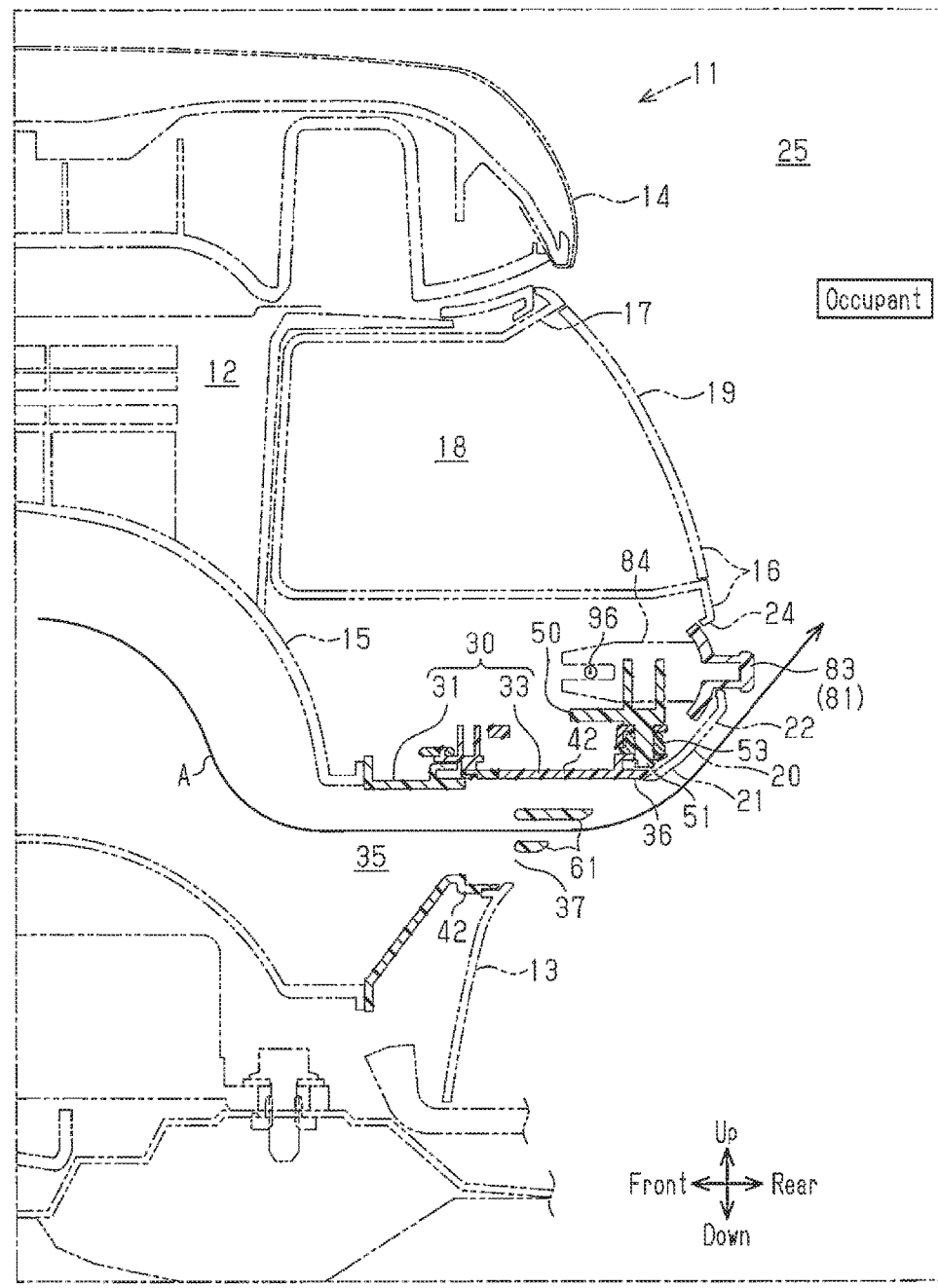
FIG. 2 is a cross-sectional view taken along line 2-2, showing the air-conditioning register of FIG. 1, together with the surrounding structure of the console box.

As shown in FIG. 2, a console box 11, which is an interior component, is arranged between the driver's seat and the front passenger seat. The location of the console box 11 is a position forward and downward from the occupant when the occupant is seated on the rear seat and maintains the sitting posture.

The console box 11 includes a box body 13 having an accommodating portion 12 with an open upper end and a lid body 14, which is arranged above the box body 13 and selectively opens and closes the accommodating portion 12. A duct 15 having a flow passage for air-conditioning air A, which is supplied from the air conditioner, is arranged in the box body 13.

A projecting portion 16, which projects rearward, is provided between the lid body 14 and the duct 15 in a rear section of the box body 13. In the present embodiment, an accommodating portion 18 having an opening 17 at the rear end and a lid portion 19 for selectively opening and closing the accommodating portion 18 are arranged in the projecting portion 16.

Figure 4:
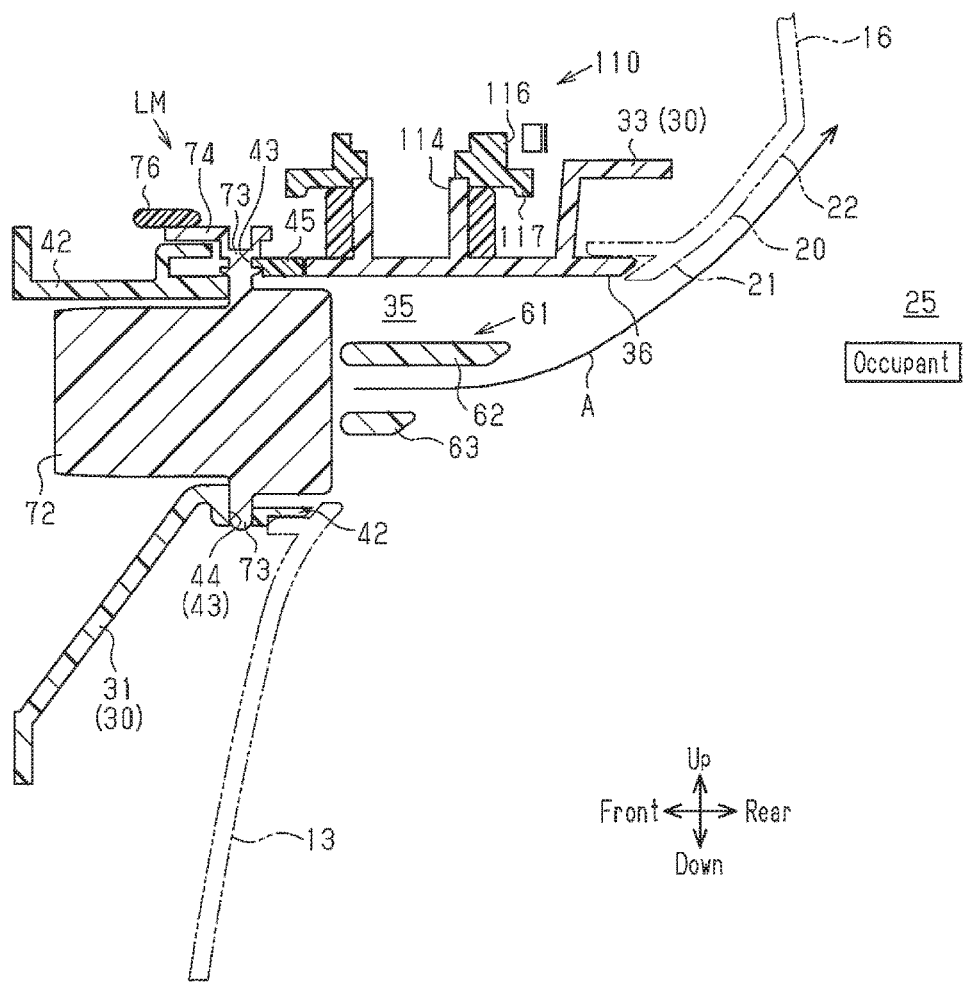
FIG. 4 is a cross-sectional view taken along line 4-4, showing the air-conditioning register of FIG. 1, together with the surrounding structure of the console box.

With reference to FIGS. 2 and 4, an inclined surface 20, which extends upward toward the rear side, is formed in the rear section of the box body 13 at a position in a lower section of the projecting portion 16. The inclined surface 20 is configured by a front inclined surface section 21 and a rear inclined surface section 22. The front inclined surface section 21 is inclined upward toward the rear side at a constant angle. The rear inclined surface section 22 is located adjacent to and rearward from the front inclined surface section 21 and inclined upward toward the rear side at a constant angle that is slightly greater than the inclination angle of the front inclined surface section 21. The inclined surface 20 is thus curved in a manner bulging diagonally rearward and downward.

Two air-conditioning registers (only one air-conditioning register is shown in the drawings) are incorporated in the rear section of the box body 13 in a state aligned in the left-right direction. The air-conditioning registers have identical configurations. Therefore, hereinafter, only one of the air-conditioning registers will be described.

The main functions of the air-conditioning register include changing the direction of the air-conditioning air A, which is supplied from the air conditioner through the duct 15, to blow the air-conditioning air A into a passenger compartment 25 and blocking the flow of the air-conditioning air A.

Figure 1:
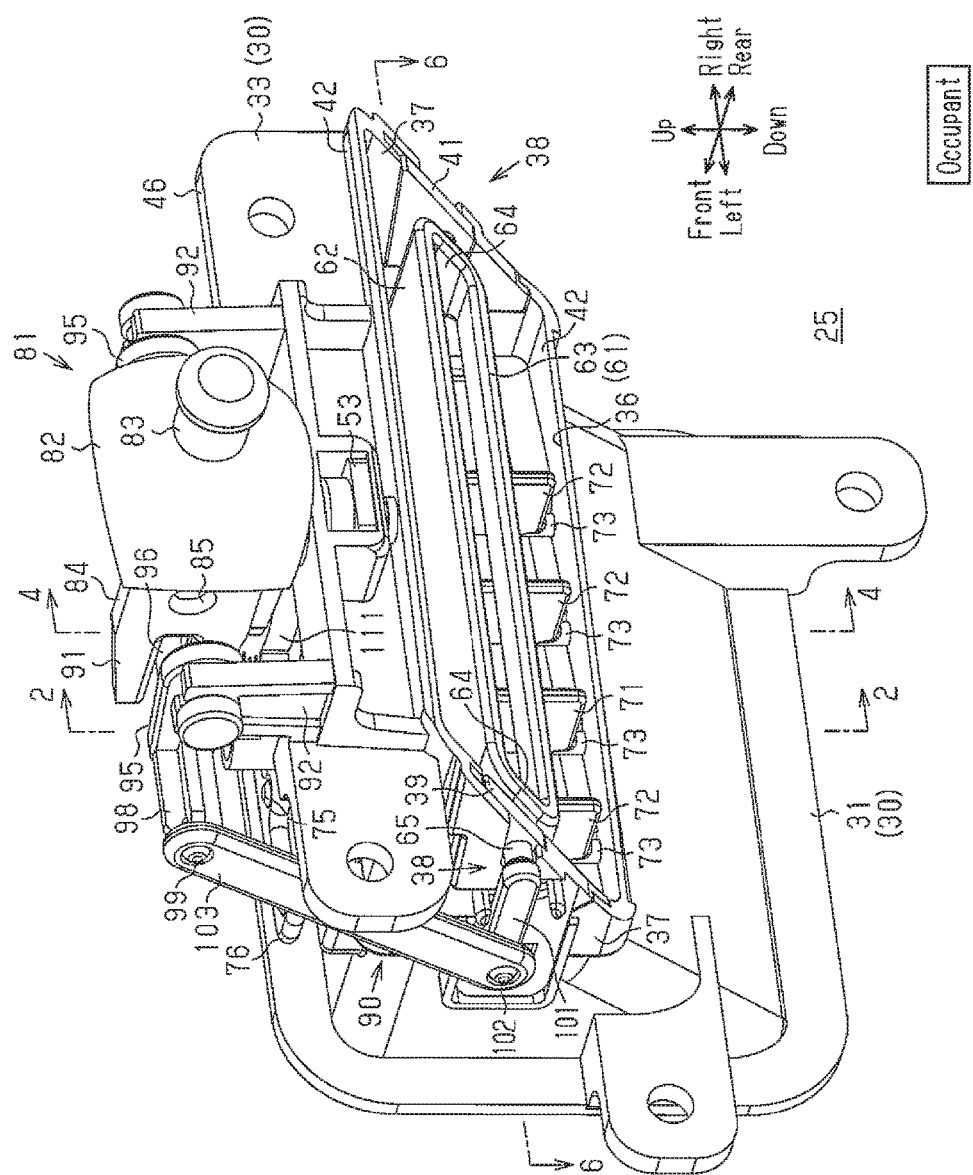
FIG. 1 is a perspective view of an air-conditioning register incorporated in a console box according to one embodiment, illustrating vertical fins and an annular fin each arranged in a neutral state.
Figure 5:
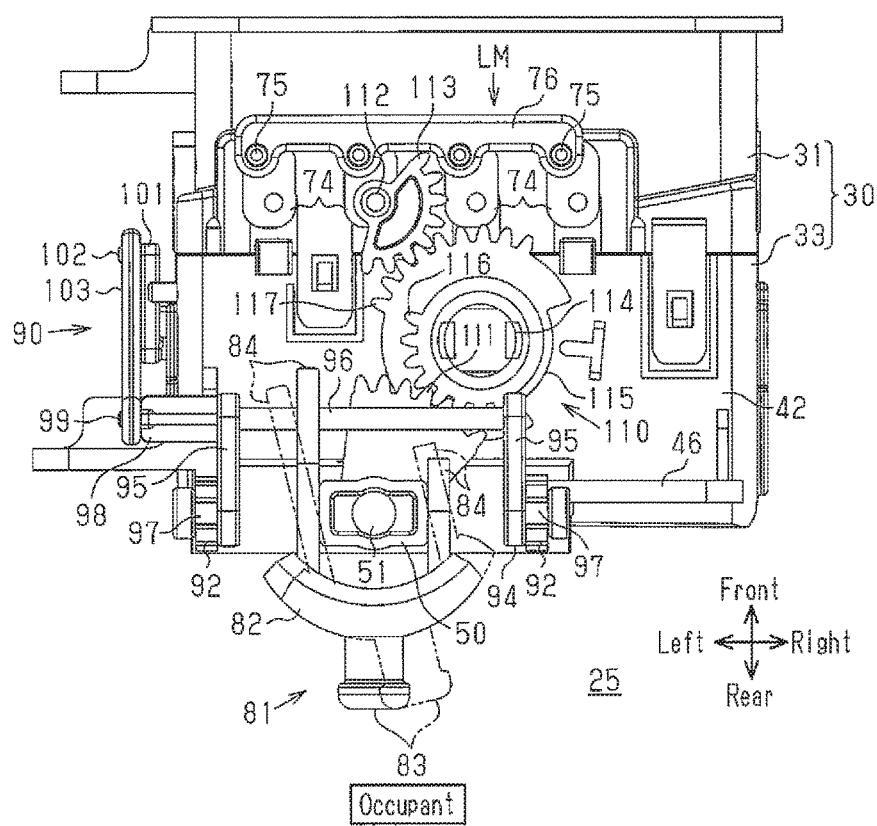
FIG. 5 is a plan view showing the air-conditioning register of FIG. 1.

As shown in FIGS. 1 and 5, the air-conditioning register includes a retainer 30, an air-direction changing member, a manipulating member 81, a first transmission mechanism 90, and a second transmission mechanism 110. The configuration of each of these components will now be described.

<Retainer 30>

Figure 6:
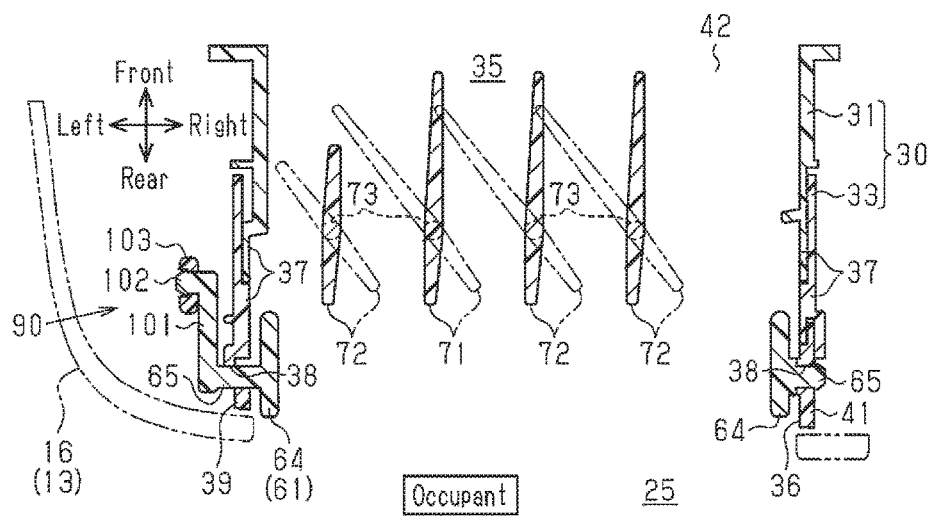
FIG. 6 is a cross-sectional view taken along line 6-6, showing the air-conditioning register of FIG. 1, together with the surrounding structure of the console box.

Referring to FIGS. 4 and 6, the retainer 30 is a member forming the framework portion of the air-conditioning register and includes a front retainer section 31 and a rear retainer section 33. The front retainer section 31 has a tubular shape having front and rear open ends. The front end of the front retainer section 31 is connected to the rear end of the duct 15 (see FIG. 2). The rear retainer section 33 is arranged rearward from and adjacent to the front retainer section 31 and coupled to a coupling target portion 32 of the front retainer section 31 through a coupling portion 34 (see FIGS. 3, 7, and 8).

The retainer 30 has a flow passage for the air-conditioning air A (hereinafter, referred to as "an airflow passage 35"). In the front retainer section 31, the communication area of the airflow passage 35 becomes maximum in the front end (substantially equal to the communication area of the flow passage of the duct 15 at the downstream end) and becomes smaller in the rearward direction.

The rear end of the airflow passage 35 is configured as an outlet 36 of the air-conditioning air A. The outlet 36 has a laterally elongated rectangular shape, the size of which is greater in the left-right direction than in the up-down direction (see FIG. 1). The opening edge of the outlet 36 is inclined downward toward the front side. The upper end of the outlet 36 is connected to the lower end of the front inclined surface section 21.

As illustrated in FIGS. 2 and 6, the airflow passage 35 is surrounded by four wall sections of the retainer 30. The four wall sections are configured by two vertical wall sections 37, which are opposed to each other in the left-right direction, and two lateral wall sections 42, which are opposed to each other in the up-down direction.

Figure 8:
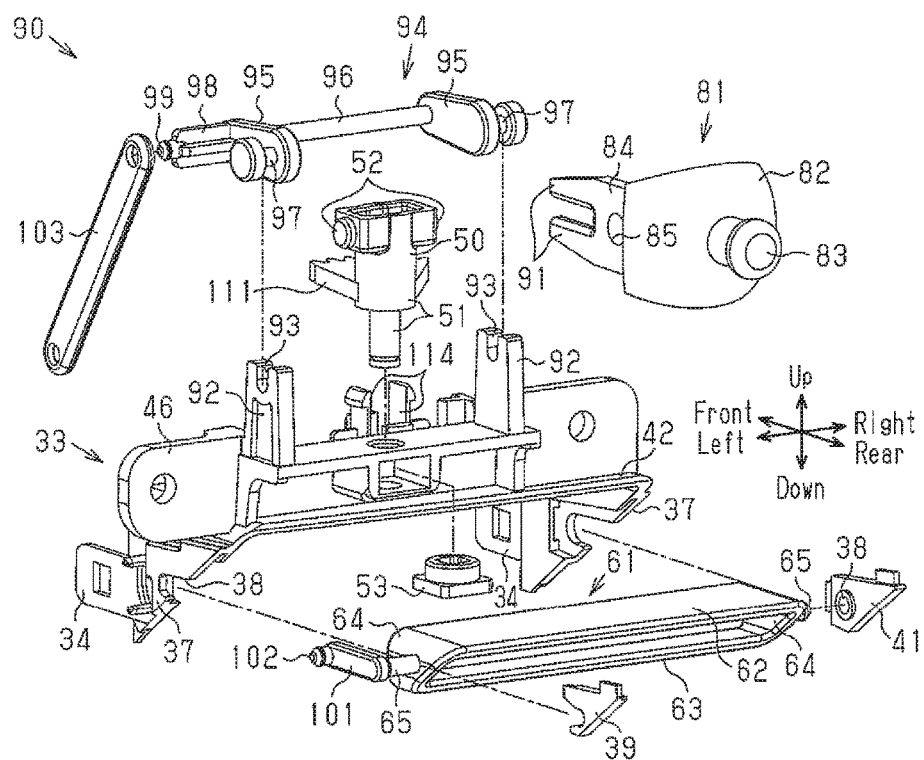
FIG. 8 is another exploded perspective view showing some of the components of the air-conditioning register of FIG. 1.

The vertical wall sections 37 are opposed to each other in a parallel or substantially parallel state. With reference to FIGS. 1 and 8, a bearing portion 38 is arranged in a middle section of each of the vertical wall sections 37 in the up-down direction. One (the left one as viewed in FIG. 1) of the bearing portions 38 is configured by the corresponding vertical wall section 37 and a bearing member 39, which is attached to the vertical wall section 37. The other one (the right one as viewed in the drawing) of the bearing portions 38 is configured by a bearing member 41, which is attached to the corresponding vertical wall section 37.

Figure 7:
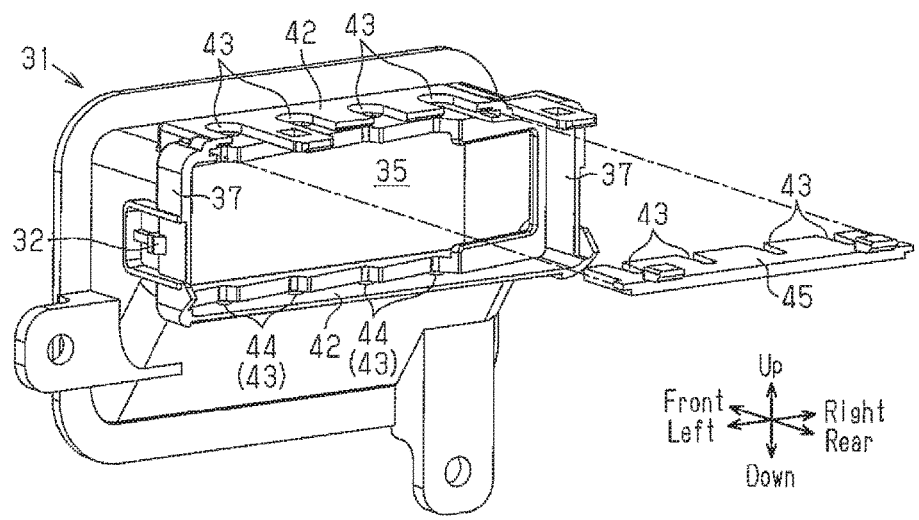
FIG. 7 is an exploded perspective view showing some of the components of the air-conditioning register of FIG. 1.

As shown in FIG. 7, bearing portions 43 are arranged at a plurality of positions spaced apart in the left-right direction in each of upper and lower lateral wall sections 42 in a coupling section between the front retainer section 31 and the rear retainer section 33. The lower ones of the bearing portions 43 are configured by holes 44, which are formed in the lower lateral wall section 42. The upper ones of the bearing portions 43 are formed between the upper lateral wall section 42 and a bearing member 45, which is attached to the upper lateral wall section 42.

<Air-Direction Changing Member>

With reference to FIGS. 4 and 8, the air-direction changing member is configured by an annular fin 61 and vertical fins, which are arranged in the retainer 30.

<Annular Fin 61>

The annular fin 61 is arranged in the airflow passage 35 at a position forward from and in the vicinity of the outlet 36. The annular fin 61 has two plate-shaped fin sections 62, 63, which are lateral fins extending in the left-right direction in a state spaced apart in the up-down direction. The opposite ends of the fin section 62 in the left-right direction are coupled to the corresponding opposite ends of the fin section 63 in the left-right direction by means of corresponding coupling plate portions 64.

With the aforementioned two fin sections 62 and 63 and two coupling plate portions 64, the annular fin 61 has an annular shape longer in the left-right direction than in the up-down direction. The front end of the lower fin section 63 is located below the front end of the upper fin section 62. The dimension of the lower fin section 63 in the front-and-rear direction is set smaller than the dimension of the upper fin section 62 in the front-and-rear direction. The rear end of the lower fin section 63 is thus located forward from the rear end of the upper fin section 62.

Referring to FIGS. 6 and 8, fin shafts 65, which project outward from the opposite coupling plate portions 64 in the left-right direction, are arranged in the annular fin 61. Each of the fin shafts 65 is supported by the corresponding one of the bearing portions 38. The annular fin 61 is pivotal in the up-and-rear direction about the fin shafts 65, which function as the pivots.

<Vertical Fin Set>

Figure 9:
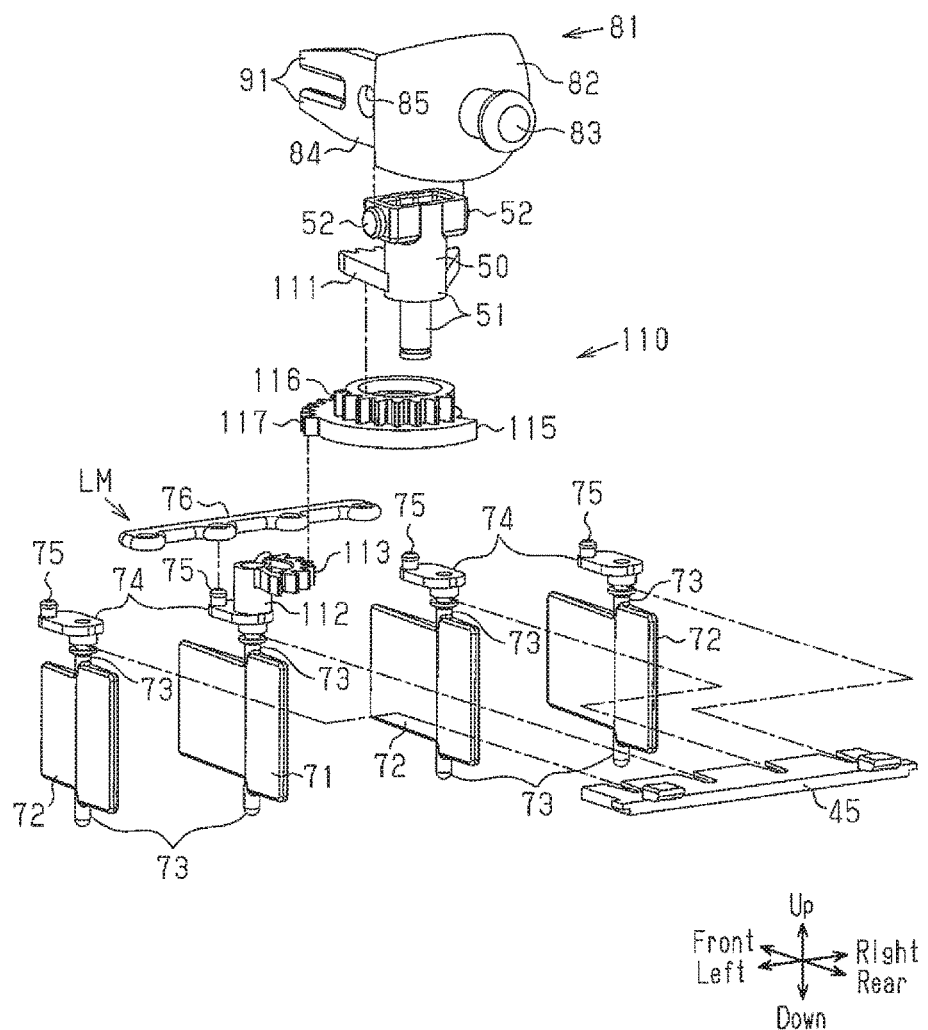
FIG. 9 is another exploded perspective view showing some of the components of the air-conditioning register of FIG. 1.

As illustrated in FIGS. 4 and 9, the vertical fin set is configured by a plurality of vertical fins, which are aligned in the airflow passage 35 at positions forward from the annular fin 61. The main section of each of the vertical fins is shape a plate extending in the up-down direction. The multiple vertical fins are arranged in a state spaced apart substantially at equal intervals and substantially parallel to one another in the left-right direction.

Hereinafter, to distinguish the multiple vertical fins, the one of the vertical fins located substantially at the middle position in the left-right direction will be referred to as "a vertical fin 71". The other ones of the vertical fins will be referred to as "vertical fins 72".

Fin shafts 73 are arranged at opposite end surfaces of each of the vertical fins 71, 72 in the up-down direction. The two, upper and lower, fin shafts 73 of each vertical fin 71, 72 are supported by the corresponding bearing portions 43. The vertical fins 71, 72 are pivotal in the left-right direction about the upper and lower fin shafts 73 as the pivots.

The upper fin shaft 73 of each vertical fin 71, 72 projects above the upper lateral wall section 42. An arm 74 is formed in an upper end of each of the fin shafts 73, which projects. Each of the arms 74 extends forward from the associated one of the fin shafts 73 as the starting point. Each arm 74 has a coupling shaft 75 at the extended end of the arm 74. The coupling shafts 75 of the arms 74 are coupled together by means of a coupling rod 76, which extends in the left-right direction. The arms 74, the coupling shafts 75, and the coupling rod 76 configure a link mechanism LM, which pivots all of the vertical fins 72 synchronously with the vertical fin 71 such that the pivoting action of each vertical fin 72 becomes equal to the pivoting action of the vertical fin 71.

<Manipulating Member 81>

With reference to FIGS. 5 and 8, the manipulating member 81 is a member manipulated by the occupant outside the retainer 30 to change the blowing direction of the air-conditioning air A from the outlet 36 or block the flow of the air-conditioning air A.

An auxiliary wall section 46 is formed on the upper lateral wall section 42 of the rear retainer section 33. A shaft member 50 is supported by the auxiliary wall section 46. The shaft member 50 includes first shaft portions 51 extending in the up-down direction and second shaft portions 52, which are arranged in an upper end of the first shaft portions 51 and extends in the direction perpendicular to the first shaft portions 51. The shaft member 50 is rotationally supported at the first shaft portions 51 by the middle section of the auxiliary wall section 46 in the left-right direction. A shim 53, which applies sliding resistance to the first shaft portions 51 and sets appropriate load (manipulation load) for manipulation of the manipulating member 81, is arranged in the auxiliary wall section 46.

The manipulating member 81 includes a base portion 82 curved in a manner bulging rearward, a knob portion 83 projecting rearward from a middle section of the base portion 82, and two support pieces 84, which are spaced apart in the left-right direction and project forward from the base portion 82 in a parallel state. A hole 85 is formed in and extends through each of the support pieces 84 in the left-right direction. The second shaft portions 52 are engaged with the holes 85 (see FIG. 9). The manipulating member 81 is thus pivotal about the first shaft portions 51 in the left-right direction and about the second shaft portions 52 in the up-down direction.

With reference to FIG. 2, a window portion 24 is formed in the projecting portion 16 of the box body 13 at a position immediately above the rear inclined surface section 22. Most of the manipulating member 81 is arranged in the rear section in the box body 13 at a position below the accommodating portion 18. The knob portion 83 of the manipulating member 81 is exposed rearward from the projecting portion 16 through the window portion 24.

<First Transmission Mechanism 90>

Figure 3:
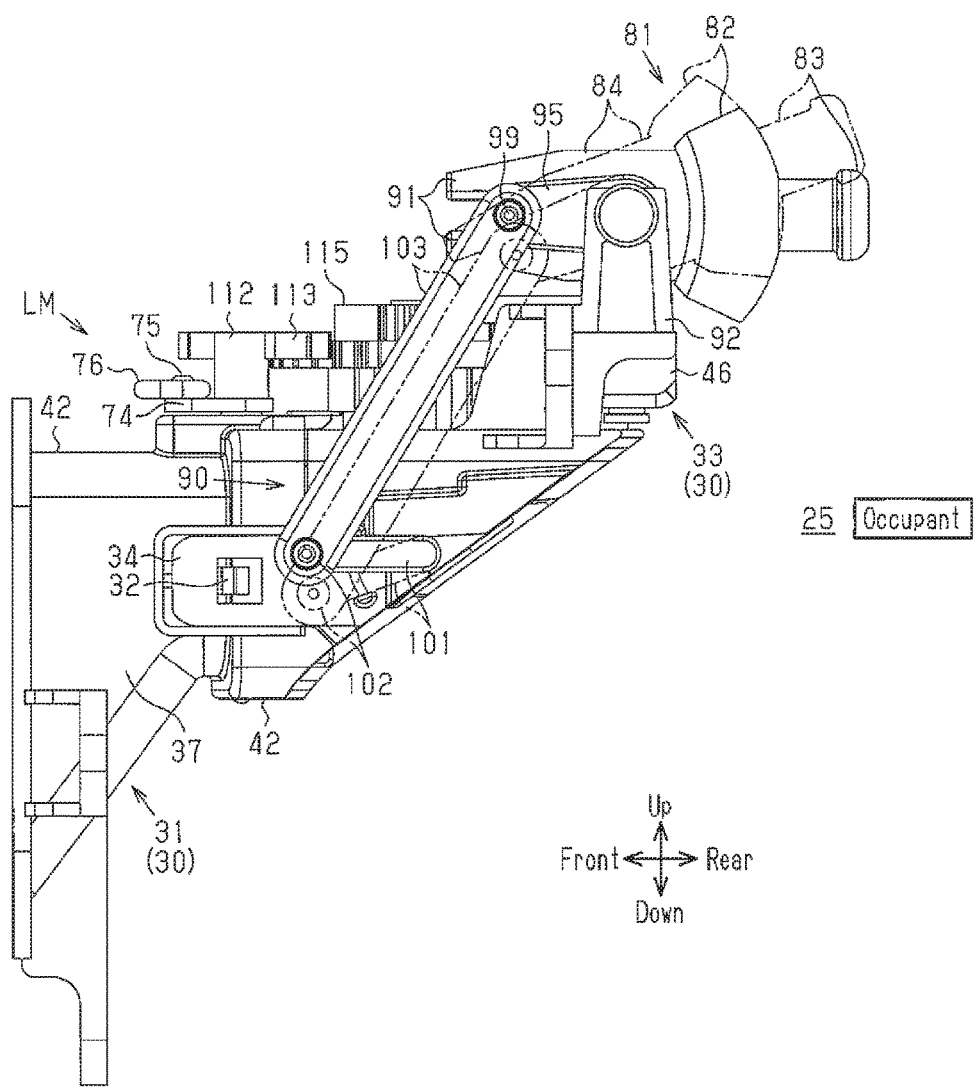
FIG. 3 is a side view showing the air-conditioning register of FIG. 1.

As illustrated in FIGS. 3 and 8, the first transmission mechanism 90 transmits pivoting action of the manipulating member 81 in the up-down direction to the annular fin 61. In the first transmission mechanism 90, two upper and lower clamping portions 91, which are bifurcations, are formed at the front end of each of the support pieces 84 of the manipulating member 81.

In the auxiliary wall section 46, two support wall sections 92, which extend upward, are formed at positions beside the shaft member 50 in the left-right direction. A transmission member 94 bridges the upper ends of the two support wall sections 92. More specifically, a bearing recess 93 is formed in the upper end of each of the support wall sections 92. The transmission member 94 includes two arms 95, which are arranged in a state spaced apart in the left-right direction. Front ends of the two arms 95 are coupled to each other through a shaft 96, which extends in the left-right direction. A journal 97, which extends outward in the left-right direction, is arranged at the rear end of each of the arms 95. The journals 97 are supported by the bearing recesses 93.

The clamping portions 91 of each support piece 84 of the manipulating member 81 clamp the shaft 96 in the up-down direction. Therefore, when the manipulating member 81 is pivoted about the second shaft portions 52 in the up-down direction, the movement of the manipulating member 81 is transmitted to the shaft 96. This swings the transmission member 94 about the two journals 97 in the up-down direction. In contrast, when the manipulating member 81 is pivoted about the first shaft portions 51 in the left-right direction, the clamping portions 91 slide on the shaft 96 in the corresponding direction. Therefore, movement of the manipulating member 81 is not transmitted to the transmission member 94 and the transmission member 94 is not operated.

A projecting piece 98, which extends leftward, is formed at the front end of one (the left one as viewed in FIG. 8) of the arms 95. The projecting piece 98 has a coupling pin 99 at the distal end of the projecting piece 98.

Correspondingly, an arm 101, which extends forward from the left fin shaft 65 of the annular fin 61 as the starting point, is formed on the fin shaft 65. The arm 101 has a coupling pin 102 at the front end. The coupling pin 99 of the transmission member 94 and the coupling pin 102 of the annular fin 61 are coupled to each other through a coupling rod 103, which is inclined upward toward the rear side.

<Second Transmission Mechanism 110>

As illustrated in FIGS. 5 and 9, the second transmission mechanism 110 transmits pivoting action of the manipulating member 81 in the left-right direction to the vertical fin 71. The second transmission mechanism 110 is configured by a plurality of gears. More specifically, a drive gear 111 is formed in the first shaft portion 51 of the shaft member 50. An extended shaft portion 112 is formed on the arm 74 of the vertical fin 71 coaxially with the associated fin shaft 73. A driven gear 113 is formed in the extended shaft portion 112. Support shafts 114 (see FIG. 8) are arranged on the corresponding lateral wall section 42 of the rear retainer section 33 each at a position substantially forward from the shaft member 50. A transmission gear 115 is rotationally supported by the support shafts 114. The transmission gear 115 has an upper gear section 116, which is meshed with the drive gear 111, and a lower gear section 117, which is meshed with the driven gear 113 at a position below the upper gear section 116.

Operation of the air-conditioning register according to the present embodiment, which is configured in the above-described manner, will hereafter be described.

FIGS. 4 and 6 show an air-conditioning register in which the annular fin 61 and the vertical fins 71, 72 are each in a neutral state.

When in the neutral state, each of the fin sections 62, 63 of the annular fin 61 is in a state substantially parallel to the lateral wall sections 42 of the retainer 30. Also, when in the neutral state, each of the vertical fins 71, 72 is in a state substantially parallel to the vertical wall sections 37 of the retainer 30.

Therefore, after flowing into the airflow passage 35 through the duct 15, the air-conditioning air A flows linearly rearward along the vertical wall sections 37 and the vertical fins 71, 72 through the spaces between the vertical wall sections 37 and the corresponding vertical fins 72, the spaces between the vertical fin 71 and the adjacent vertical fins 72, and the space between the adjacent vertical fins 72. After passing the vertical fins 71, 72, the air-conditioning air A flows linearly rearward along the lateral wall sections 42 and the fin sections 62, 63 through the space between the upper lateral wall section 42 and the fin section 62, the space between the lower lateral wall section 42 and the fin section 63, and the space between the adjacent fin sections 62, 63. The air-conditioning air A is then blown rearward from the outlet 36 of the retainer 30.

If the knob portion 83 of the manipulating member 81 in the neutral state is held by the occupant to apply force acting rightward, for example, to the knob portion 83, the manipulating member 81 is pivoted rightward (counterclockwise) about the first shaft portions 51 of the shaft member 50, which function as pivots, as represented by the long dashed double-short dashed lines in FIG. 5. The drive gear 111 is thus rotated in the corresponding direction, thus changing the meshing position between the drive gear 111 and the upper gear section 116 and, also, the meshing position between the lower gear section 117 and the driven gear 113. As a result, as represented by the long dashed double-short dashed lines in FIG. 6, the vertical fin 71 is pivoted about the associated fin shaft 73 as the pivot in the same direction as the direction in which the knob portion 83 is manipulated. As shown in FIGS. 5 and 9, such movement of the vertical fin 71 about the fin shaft 73 as the pivot is transmitted to all of the other vertical fins 72 through the coupling shafts 75, the coupling rod 76, and the arms 74. Through such transmission, all of the vertical fins 72 are pivoted in the same pivoting direction as the vertical fin 71 synchronously with the vertical fin 71. The air-conditioning air A flows along the vertical fins 71, 72, the inclinations of which have been changed, thus changing the flow direction to the same direction as the direction of the force applied to the knob portion 83 (the rightward direction).

Although not illustrated, when the manipulating member 81 is continuously pivoted in the aforementioned direction, each adjacent pair of the vertical fins 71, 72 becomes overlapped with each other such that the airflow passage 35 is switched to a blocked state. This stops the air-conditioning air A from flowing rearward from the vertical fins 71, 72, thus blocking the flow of the air-conditioning air A from the outlet 36.

When force acting in the up-down direction is applied to the knob portion 83 in the neutral state, the manipulating member 81 is pivoted in the corresponding direction about the second shaft portions 52 of the shaft member 50, which function as the pivots, as illustrated in FIGS. 3 and 8. Such pivoting action is transmitted to the transmission member 94 through the clamping portions 91 and the shaft 96. The transmission member 94 thus swings about the two journals 97, which function as the pivots, in the direction opposite to the direction of the force applied to the knob portion 83. Such swing of the transmission member 94 is transmitted to the annular fin 61 through the projecting piece 98, the coupling pin 99, the coupling rod 103, and the coupling pin 102. This pivots the annular fin 61. The air-conditioning air A flows along the fin sections 62, 63 of the annular fin 61, the inclination of which has been changed, thus changing the flow direction to the same direction as the direction of the force applied to the knob portion 83. The air-conditioning air A is then blown from the outlet 36, which has a laterally elongated rectangular shape, which is sized greater in the left-right direction than in the up-down direction.

With reference to FIGS. 2 and 4, after having been blown from the outlet 36, as has been described, the air-conditioning air A flows along the front inclined surface section 21 due to the Coanda effect. Since the upper end of the outlet 36 is connected to the lower end of the front inclined surface section 21, the air-conditioning air A flows along the front inclined surface section 21 immediately after having been blown from the outlet 36. Also, most of the air-conditioning air A, which has been blown from the outlet 36 having the laterally elongated rectangular shape, flows close to the front inclined surface section 21. This ensures further effective exertion of the Coanda effect.

After having passed the front inclined surface section 21, the air-conditioning air A flows along the rear inclined surface section 22, which is rearward from and adjacent to the front inclined surface section 21 and inclined at an angle greater than the front inclined surface section 21, due to the Coanda effect, as in the above-described case. The flow direction is changed efficiently and in a stepped manner to proceed upward toward the rear side, or, in other words, toward the occupant.

If the annular fin 61 is pivoted from the neutral state upward toward the rear side, the amount of the air-conditioning air A flowing to the front inclined surface section 21 and the rear inclined surface section 22 increases. A greater amount of the air-conditioning air A flows along the front inclined surface section 21 and the rear inclined surface section 22 than when the annular fin 61 is in the neutral state. As a result, the air-conditioning air A flows toward a higher position than when the annular fin 61 is in the neutral state.

If, in contrast, the annular fin 61 is pivoted from the neutral state downward toward the rear side, the amount of the air-conditioning air A flowing to the front inclined surface section 21 and the rear inclined surface section 22 decreases. A smaller amount of the air-conditioning air A flows along the front inclined surface section 21 and the rear inclined surface section 22 than when the annular fin 61 is in the neutral state. As a result, the air-conditioning air A flows toward a lower position than when the annular fin 61 is in the neutral state.

Therefore, despite the fact that the outlet 36 of the air-conditioning register is located at a position forward and downward from the occupant, who maintains the sitting posture in the passenger compartment 25, the air-conditioning air A also flows toward the upper body of the occupant.

The projecting portion 16 of the console box 11 is located between the retainer 30 and the annular fin 61 of the air-conditioning register and the occupant, who maintains the sitting posture in the passenger compartment 25. In other words, when the occupant faces forward and downward, the projecting portion 16 of the console box 11 is located in the line of sight of from the occupant. The projecting portion 16 projects toward the occupant at a position forward and downward from the occupant, conceals the retainer 30 and the annular fin 61, which are arranged immediately below the projecting portion 16, and hiding the retainer 30 and the annular fin 61 from the side of the occupant.

Also, the outlet 36, which has the inclined opening edge, becomes more separate from the occupant toward the lower side. The outlet 36 is thus concealed by the projecting portion 16 more easily than an outlet without an inclined opening edge.

Further, the rear end of the lower fin section 63, which is located forward from the rear end of the upper fin section 62, is more separate forward from the occupant and thus concealed more easily by the projecting portion 16 than the rear end of the lower fin section 63 located below the rear end of the upper fin section 62.

Additionally, the outlet 36, which has the laterally elongated rectangular shape sized greater in the left-right direction than in the up-down direction, is concealed more easily by the projecting portion 16 than a differently shaped outlet.

The manipulating member 81 is arranged above the rear inclined surface section 22 of the projecting portion 16. Also, the knob portion 83 of the manipulating member 81 is exposed rearward from the projecting portion 16 through the window portion 24. The knob portion 83 is thus visible from the occupant, thus ensuring visual confirmation of the location of the knob portion 83. This facilitates manual manipulation of the knob portion 83.

Specifically, if the manipulating member 81 is arranged in the retainer 30 (the airflow passage 35), the manipulating member 81 causes airflow resistance, generates turbulence in the flow of the air-conditioning air A, and increases pressure loss. Also, such location of the manipulating member 81 decreases the intensity of the air-conditioning air A blown from the outlet 36, shortens the distance covered by the flow of the air-conditioning air A, and increases noise. These problems are more pronounced with the outlet 36, which has the laterally elongated rectangular shape of a size greater in the left-right direction than in the up-down direction.

This is because of the fact that the manipulating member 81, which decreases the actual opening area of the outlet 36, decreases the actual opening area of the outlet 36 to a comparatively great extent when the outlet 36 has the laterally elongated rectangular shape. Specifically, the actual opening area refers to the surface area of the range other than the range onto which the manipulating member 81 is reflected on a plane perpendicular to the airflow direction of the air-conditioning air A at the outlet 36.

However, in the present embodiment, the manipulating member 81 is arranged outside the retainer 30. Additionally, the first transmission mechanism 90 and the second transmission mechanism 110 are also arranged outside the retainer 30. Therefore, despite the fact that the outlet 36 has the laterally elongated rectangular shape, increase of the airflow resistance caused by the manipulating member 81, the first transmission mechanism 90, and the second transmission mechanism 110 is restrained. Turbulence of the flow of the air-conditioning air A is thus unlikely to occur and the pressure loss is decreased. The air-conditioning air A is thus intensely blown from the outlet 36. Also, the distance covered by the flow of the air-conditioning air A is increased and the noise is restrained.

The present embodiment, which has been described, has the advantages described below.

(1) The air-conditioning register of the present embodiment is incorporated in the console box 11 (FIGS. 2 and 4), which has the projecting portion 16 projecting rearward at a position forward and downward from the occupant who maintains the sitting posture in the passenger compartment 25. The front inclined surface section 21 and the rear inclined surface section 22, which extend upward toward the rear side, are formed in the lower section of the projecting portion 16.

The retainer 30, which has the outlet 36 at the rear end of the retainer 30, and the vertical fins 71, 72 and the annular fin 61, which are arranged in the retainer 30, are arranged immediately below the projecting portion 16 at a position forward from the front inclined surface section 21.

The manipulating member 81 is arranged outside the retainer 30 at a position above the rear inclined surface section 22 with a section of the manipulating member 81 (the knob portion 83) exposed rearward from the projecting portion 16 (FIGS. 2 and 4).

Further, the first transmission mechanism 90 and the second transmission mechanism 110, which transmit movement of the manipulating member 81 to the annular fin 61 and the vertical fins 71, 72, are arranged in the console box 11 (FIG. 5).

The outlet 36 of the air-conditioning air A is hard to see by the occupant (FIGS. 2 and 4).

Also, by manipulating the manipulating member 81, the direction of the air-conditioning air A blown from the outlet 36 is changed and the flow of the air-conditioning air A from the outlet 36 is blocked.

(2) The knob portion 83 of the manipulating member 81 is exposed rearward from the projecting portion 16 through the window portion 24 (FIG. 2).

This facilitates visual confirmation of the location of the knob portion 83.

In an air-conditioning register having an outlet the size of which is greater in the left-right direction than in the up-down direction and a manipulating member arranged in the outlet, other components are located in the vicinity of the manipulating member and thus make it difficult to hold and manipulate the manipulating member.

However, in the present embodiment, the vicinity of the knob portion 83 is clear from other components. The knob portion 83 is thus easy to hold and manipulate and has improved usability.

(3) As a transmission mechanism, the first transmission mechanism 90 is provided, which transmits pivoting action of the manipulating member 81 to the fin sections 62, 63 of the annular fin 61, which function as lateral fins, to pivot the fin sections 62, 63 in the up-down direction (FIGS. 3 and 8).

Therefore, when the occupant manipulates and pivots the manipulating member 81, the fin sections 62, 63 are pivoted to change the direction of the air-conditioning air A blown from the outlet 36 in the up-down direction.

Also, the air-conditioning air A is blown from the outlet 36 in the same direction as the direction in which the manipulating member 81 is manipulated (in the up-down direction).

(4) As a transmission mechanism, the second transmission mechanism 110 is provided, which transmits pivoting action of the manipulating member 81 to the vertical fin 71 to pivot the vertical fin 71 in the left-right direction (FIGS. 5 and 9).

Therefore, when the occupant manipulates and pivots the manipulating member 81, the vertical fin 71 is pivoted to change the direction of the air-conditioning air A blown from the outlet 36 in the left-right direction.

Also, the air-conditioning air A is blown from the outlet 36 in the same direction as the direction in which the manipulating member 81 is manipulated (in the left-right direction).

(5) A common member (the manipulating member 81) is used as a manipulating member manipulated to pivot the vertical fin 71 and a manipulating member manipulated to pivot the annular fin 61 (FIG. 5).

Therefore, by manipulating the single manipulating member 81, both the annular fin 61 and the vertical fin 71 are pivoted. This decreases the number of manipulating members such that the air-conditioning register can be configured with a smaller number of components. Also, outer appearance is improved compared to a case having a plurality of manipulating members.

(6) The rear end of the retainer 30 is shaped to incline the opening edge of the outlet 36 downward toward the front side (FIGS. 1 and 4).

The outlet 36 is thus hard to see by the occupant compared to a case with a non-inclined outlet.

(7) The dimension of the lower fin section 63 in the front-and-rear direction is set smaller than the dimension of the upper fin section 62 in the front-and-rear direction. The rear end of the lower fin section 63 is thus located forward from the rear end of the upper fin section 62 (FIG. 4).

As a result, the lower fin section 63 is hard to see by the occupant compared to a case in which the rear end of the lower fin section 63 is located below the rear end of the upper fin section 62.

(8) The upper end of the outlet 36 is connected to the lower end of the front inclined surface section 21 (FIG. 4).

Therefore, immediately after having been blown from the outlet 36, the air-conditioning air A is caused to flow along the front inclined surface section 21 and then the rear inclined surface section 22. The flow direction of the air-conditioning air A is thus changed efficiently to proceed upward toward the occupant.

(9) The inclined surface 20 is configured by the front inclined surface section 21 and the rear inclined surface section 22 (FIG. 4). The front inclined surface section 21 is inclined upward toward the rear side at a constant angle. The rear inclined surface section 22 is located rearward from the front inclined surface section 21 and inclined upward toward the rear side at a constant angle greater than the inclination angle of the front inclined surface section 21.

Therefore, by causing the air-conditioning air A to flow sequentially along the front inclined surface section 21 and the rear inclined surface section 22, the flow direction of the air-conditioning air A is changed in a stepped manner to proceed upward toward the occupant.

(10) The outlet 36 is formed in the laterally elongated rectangular shape, the size of which is greater in the left-right direction than in the up-down direction (FIG. 1). The first transmission mechanism 90 and the second transmission mechanism 110 are arranged outside the retainer 30 (FIG. 5).

This makes the outlet 36 hard to see by the occupant.

Also, most of the air-conditioning air A blown from the outlet 36 is caused to flow closely to the front inclined surface section 21, which is in the lower section of the projecting portion 16. This ensures more effective exertion of the Coanda effect.

Further, increase of airflow resistance caused by the first transmission mechanism 90 and the second transmission mechanism 110 is restrained. Correspondingly, the pressure loss and noise are decreased.

(11) Many of the components of the air-conditioning register are arranged immediately below the projecting portion 16 (FIG. 2).

This ensures space in the projecting portion 16, which allows arrangement of the accommodating portion 18 in the projecting portion 16.

The illustrated embodiment may be embodied as modified examples described below.

<Regarding Projecting Portion 16>

In the illustrated embodiment, the accommodating portion 18 is arranged in the space in the upper section of the projecting portion 16. However, instead of the accommodating portion 18, various types of devices may be incorporated in this space.

<Regarding Outlet 36>

The shape of the opening edge of the outlet 36 may be modified to a shape different from the corresponding shape of the illustrated embodiment.

The opening edge of the outlet 36 may be formed to extend vertically without being inclined.

<Regarding Air-Direction Changing Member>

The number of fin sections 62, 63 (lateral fins) may be changed to three or greater.

In this case, it is desirable to arrange the fin sections 62, 63 such that the lower the position of the lateral fin, the more forward the rear end the fin section becomes.

In this manner, the lower the position of the fin portion, the farther from the occupant, the farther forward from the occupant the rear end of the fin section 63 becomes (become). As a result, the fin sections 62, 63 are easily concealed by the projecting portion 16 and thus become hard to see by the occupant.

The coupling plate portions 64 may be omitted from the annular fin 61 and the two fin sections 62, 63 may be formed independently from each other as lateral fins.

In contrast to the illustrated embodiment, the vertical fins 71, 72 may be arranged rearward from the annular fin 61.

<Regarding the Inclined Surface>

The inclined surface may be configured by a single flat surface inclined upward toward the rear side at a constant angle.

The inclined surface may be configured by three or more flat surface sections having inclination angles becoming greater toward the rear side.

The inclined surface may be configured by a surface curved at an inclination angle becoming gradually greater toward the rear side.

A shut-off damper, which closes the airflow passage 35 to block the flow of the air-conditioning air A from the outlet 36, may be arranged forward from the vertical fins 71, 72, separately from the vertical fins 71, 72.

<Regarding the Manipulating Member 81>

A manipulating member for pivoting the annular fin 61 through the first transmission mechanism 90 and a manipulating member for pivoting the vertical fin 71 through the second transmission mechanism 110 may be configured by separate members.

The manipulating member 81 may be arranged in a state in which a greater part of the manipulating member 81 is exposed rearward from the projecting portion 16 than in the illustrated embodiment.

<Regarding the Installation Location>

The illustrated air-conditioning register is employable as an air-conditioning register incorporated at any location in the passenger compartment other than the console box 11, such as a location in an instrument panel forward and downward from a vehicle occupant in a front seat (the driver's seat or a front passenger seat).

This case has the advantage described below.

A blower fan of an air conditioner is arranged in a lower section of an instrument panel. After having been supplied from the blower fan, the air-conditioning air is introduced to an air-conditioning register through a duct. In a typical vehicle, the air-conditioning register is arranged in an upper section of the instrument panel, which is a location greatly spaced from the blower fan. This arrangement requires a long duct to connect the blower fan to the air-conditioning register. As a result, a great loss is caused by the air-conditioning air flowing through the long duct.

However, as in the above-described case, the air-conditioning register incorporated in the lower section of the instrument panel decreases the distance between the blower fan and the air-conditioning register. Correspondingly, the length of the duct that connects the blower fan to the air-conditioning register is also decreased. This decreases the loss caused by the air-conditioning air flowing in the duct, thus ensuring efficient introduction of the air-conditioning air to the air-conditioning register.

It is preferable that the interior component be a console box that is arranged in a lower section between adjacent vehicle seats and has a projecting portion projecting rearward in a rear section of the console box and that the outlet of the retainer, which is arranged immediately below the projecting portion, open rearward.

In the above-described configuration, after the air-conditioning air is blown from the outlet of the retainer, which is arranged immediately below the projecting portion in the rear section of the console box arranged in the lower section between adjacent vehicle seats, the air-conditioning air flows along the inclined surface to flow diagonally rearward and upward before reaching a vehicle occupant seated on a rear seat.

Therefore, the console box is suitable as an interior component in which the air-conditioning register is incorporated.

The invention claimed is:

1. An assembly comprising an air-conditioning register and an interior component, the air-conditioning register comprising:

a retainer having an airflow passage for air-conditioning air and an outlet at a rear end of the retainer;

an air-direction changing member arranged in the retainer to change a flow direction of the air-conditioning air in the airflow passage;

a manipulating member manipulated to operate the air-direction changing member; and a transmission mechanism arranged in the interior component, wherein the transmission mechanism transmits movement of the manipulating member to the air-direction changing member, and the interior component comprising:

a projecting portion projecting rearward and being arranged forward and downward from an occupant sitting position in a passenger compartment of a vehicle, wherein the projecting portion has, in a lower section, an inclined surface which is inclined upward toward a rear side, wherein the air-conditioning register is adapted to be incorporated in the interior component, exposing at least a section of the manipulating member rearward from the projecting portion at a position above the inclined surface, wherein the retainer and the air-direction changing member are arranged immediately below the projecting portion at a position forward of the inclined surface relative to the occupant sitting position, an upper end of the outlet is connected to a lower end of the inclined surface, and the inclined surface guide is configured to guide air-conditioned air exiting the outlet in a direction along the inclined surface and toward the occupant sitting position, and wherein the projecting portion projects toward the occupant sitting position and hides the outlet from the occupant sitting position.

2. The assembly according to claim 1, wherein the air-direction changing member includes a plate-shaped lateral fin, the lateral fin extends in a left-right direction, the lateral fin is arranged in the retainer in a pivotal manner, the manipulating member is supported in a pivotal manner, and the transmission mechanism includes a first transmission mechanism for transmitting a pivoting action of the manipulating member to the lateral fin to pivot the lateral fin in an up-down direction.

3. The assembly according to claim 1, wherein the air-direction changing member includes a plate-shaped vertical fin, the vertical fin extends in an up-down direction, the vertical fin is arranged in the retainer in a pivotal manner, the manipulating member is supported in a pivotal manner, and the transmission mechanism includes a second transmission mechanism for transmitting a pivoting action of the manipulating member to the vertical fin to pivot the vertical fin in a left-right direction.

4. The assembly according to claim 1, wherein the outlet is inclined downward toward a front side.

5. The assembly according to claim 4, wherein
a plurality of lateral fins are arranged forward from the outlet in a pivotal manner,
the lateral fins configure at least a part of the air-direction changing member,
the lateral fins extend in the left-right direction in a state spaced apart in the up-down direction, and
the lateral fins are arranged such that the lower the position of the lateral fin, the more forward the rear end of the lateral fin becomes.

6. The assembly according to claim 1, wherein an upper end of the outlet is connected to a lower end of the inclined surface.

7. The assembly according to claim 1, wherein the inclined surface includes
a front inclined surface section inclined upward toward a rear side at a constant angle, and
a rear inclined surface section located rearward from and adjacent to the front inclined surface section, wherein the rear inclined surface section is inclined upward toward the rear side at a constant angle greater than the inclination angle of the front inclined surface section.

8. The assembly according to claim 1, wherein
the outlet has a laterally elongated rectangular shape a size of which is greater in a left-right direction than in an up-down direction, and
the transmission mechanism is arranged outside the retainer.

9. The assembly according to claim 1, wherein
the interior component is a console box, which is arranged in a lower part between adjacent vehicle seats and has the projecting portion projecting rearward in a rear section of the console box, and
the outlet of the retainer is arranged immediately below the projecting portion and the outlet opens rearward.

* * * * *